United States Patent [19]

Tsunekawa et al.

[11] Patent Number: 4,642,451
[45] Date of Patent: Feb. 10, 1987

[54] DISTANCE MEASURING DEVICE WITH VARIOUS CONTROLS OF THE LIGHT EMITTING MEANS

[75] Inventors: Tokuichi Tsunekawa; Yuichi Sato; Takashi Kawabata; Susumu Matsumura, all of Kanagawa, Japan

[73] Assignee: Canon Kabushiki Kaisha, Japan

[21] Appl. No.: 595,283

[22] Filed: Mar. 30, 1984

[30] Foreign Application Priority Data

| Apr. 1, 1983 [JP] | Japan | 58-57202 |
| Apr. 1, 1983 [JP] | Japan | 58-57203 |
| Apr. 1, 1983 [JP] | Japan | 58-57205 |
| Apr. 1, 1983 [JP] | Japan | 58-57209 |

[51] Int. Cl.$^4$ .............................. G01J 1/20; G01J 1/32
[52] U.S. Cl. ...................... 250/201; 250/205; 354/403
[58] Field of Search ............... 250/201, 205, 214 B; 356/1, 4; 354/403

[56] References Cited

U.S. PATENT DOCUMENTS

| 4,274,735 | 6/1981 | Tamura et al. | 354/403 |
| 4,315,159 | 2/1982 | Niwa et al. | 250/214 B |
| 4,368,978 | 1/1983 | Tsunekawa et al. | 356/4 |
| 4,477,168 | 10/1984 | Hosoe | 354/403 |
| 4,521,106 | 6/1985 | Lambeth | 354/403 |
| 4,522,492 | 6/1985 | Masunaga | 250/201 |

*Primary Examiner*—David C. Nelms
*Assistant Examiner*—Michael Messinger
*Attorney, Agent, or Firm*—Toren, McGeady and Goldberg

[57] ABSTRACT

In the disclosed distance measuring device a light source projects light on an object to be photographed. A photo-electric converter for receiving light reflected from the object includes at least one photo-electric converting portion whose electric charge varies according to the quantity of light incident thereon. A control includes a first electric charge store which stores an electric charge produced at the photo-electric converting portion while the light is projected from the light source, a second electric charge store which stores an electric charge produced at the photo-electric converting portion while light is not projected from the light source, and a detector which detects at least one of the amounts of electric charge stored at the first and second electric charge stores. The control varies the quantity of light projected by the light source on the basis of the result detected by the detector.

11 Claims, 12 Drawing Figures

F I G. 1(a)
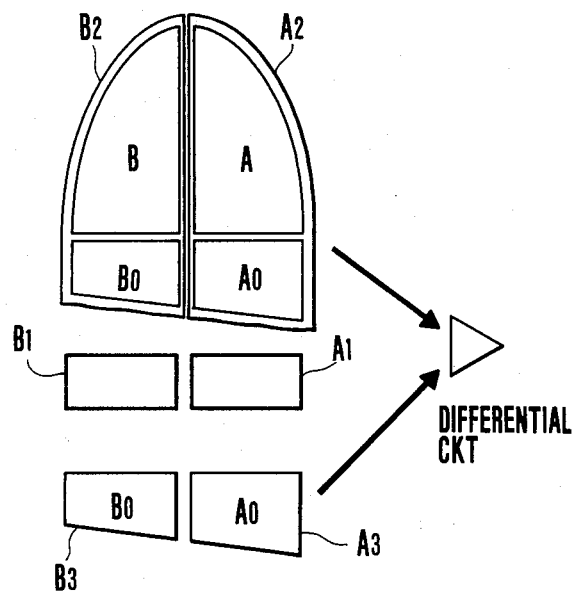
F I G. 1(b)
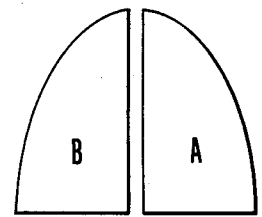
F I G. 1(c)
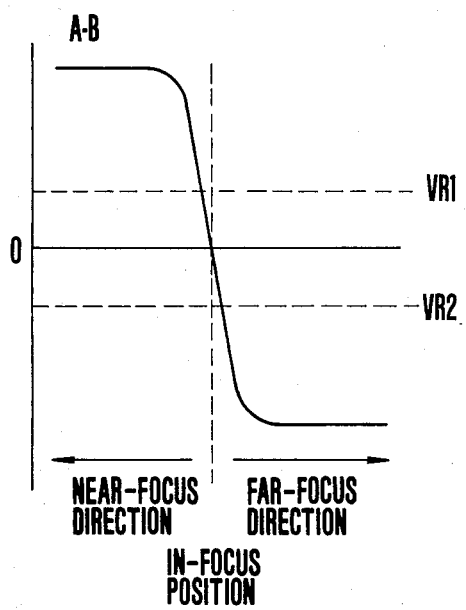

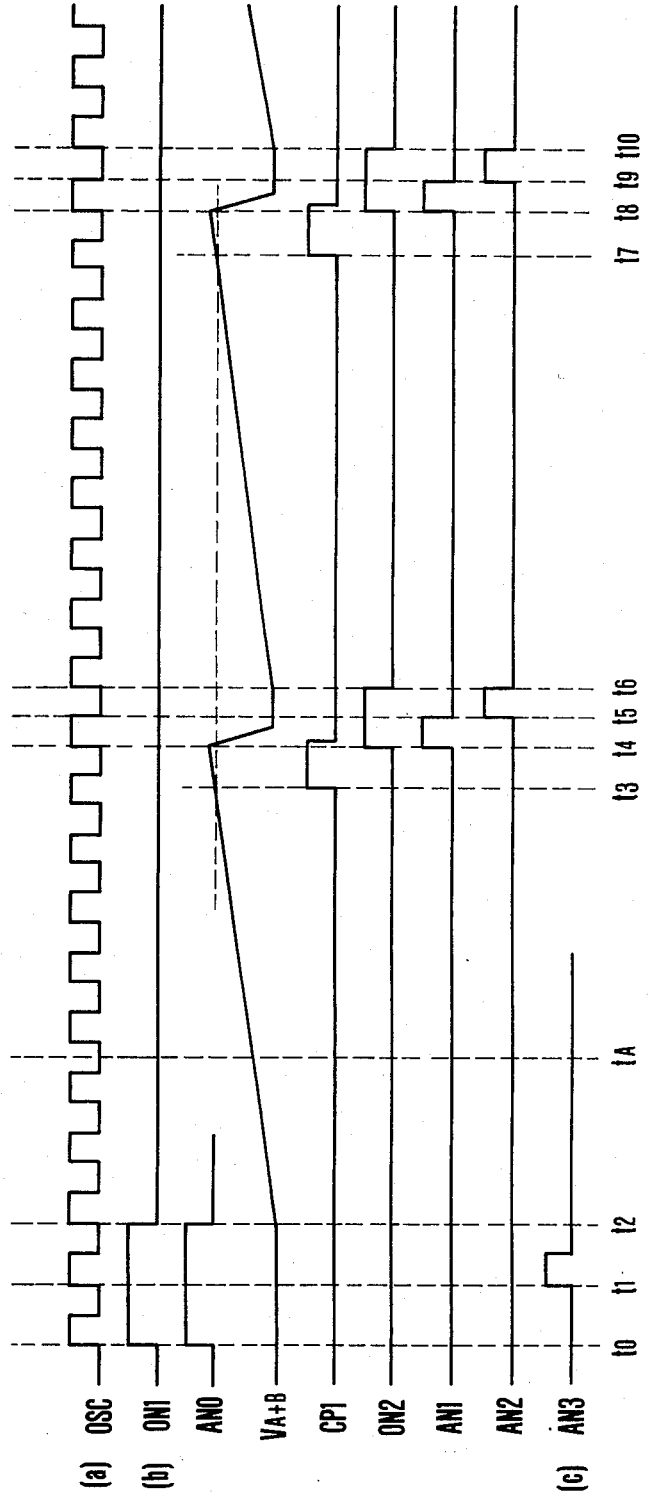

DISTANCE MEASURING DEVICE WITH VARIOUS CONTROLS OF THE LIGHT EMITTING MEANS

BACKGROUND OF THE INVENTION

1. Field of the Invention

This invention relates to a distance measuring device and more particularly to a device adapted for measuring a distance to an object by projecting a "distance measuring" light onto the object from the device; by receiving light reflected from the object with a light receiver; by photo-electrically converting the reflected light incident on the light receiver; by detecting the amount of electric charge obtained and stored through the photo-electric conversion; and by determining the object distance according to a resulting detection signal. The invention also relates to a control device arranged to adjust the quantity of light projected from a light source to illuminate the object on the basis of the intensity of the light reflected from the object.

2. Description of the Prior Art

Devices of various kinds have been developed for the purpose of measuring the distance at which an object is located relative to a photographic camera. These distance measuring devices for cameras of the prior art include so-called automatic focusing devices. There light of a predetermined value is projected on a photographic object; the object distance is detected by receiving light reflected from the object with a detector (or a light sensitive element); and the focus point of a photo-taking lens is adjusted by shifting the position of the lens according to a detected distance signal.

Known automatic focusing devices of the prior art are always arranged to project a given fixed quantity of light. Therefore, the quantity of the light reflected by the object is excessive when the object is nearby and is insufficient when the object is far away. This makes it difficult to obtain a good distance signal and the accuracy of the resulting measurements have been unsatisfactory. Also, unimproved conventional distance measuring devices have wasted energy by always projecting a fixed quantity of light during a distance measuring operation.

Various types of light receivers for use in photographic camera distance measuring devices have been developed. These include photosensor devices of the electric charge storing type such as semiconductor CCD photosensors, semiconductor CCD photodiodes, etc. Such a photosensor device is disclosed by U.S. Pat. No. 4,315,159 corresponding to Japanese Laid-Open Patent Application No. SHO 54-154382. The photosensor device of this U.S. patent comprises a photosnesor having at least one sensor element which generates an electric charge according to a light incident thereon; first and second electric charge stores each of which is provided with the same number of electric charge storing the electric charge generated by the sensor element; a first control gate which controls the flow of the electric charge from the photosensor to the first electric charge store; and a second control gate which controls the flow of the electric charge from the photosensor to the second electric charge store. The device is thus arranged to apply voltages alternately to the first and second gates to allow the first and second electric charge stores to alternately store the electric charge generated at the photosensor part. In a photosensor device such as the one disclosed by this U.S. patent, it is sometimes not possible to obtain a correct signal representing the extent to which a focusing lens is to be shifted. This occurs where the detected value of the electric charge stored at the electric charge store varies as the reflection factor, or location of the object varies to produce stronger or weaker light reflections from the object.

SUMMARY OF THE INVENTION

A first object of the present invention is to provide a distance measuring device having light emitting means for projecting a light on a distance measuring object for detecting a distance to the object and light receiving means which receives a reflection from the object and detects the amount of an electric charge generated according to the quantity of the reflection light incident thereon.

A second object of the invention is to provide an arrangement for carrying out highly accurate distance measurement in the above-stated distance measuring device wherein the quantity of the light projected from the light emitting means is controlled and adjusted according to the quantity of light received by the light receiving means (amount of the electric charge stored), so that the accuracy of a signal produced from the light receiving means can be enhanced.

A third object of the invention is to provide light receiving means for a distance measuring device including a photo-electric converting part arranged to have the amount of electric charge thereof vary with the quantity of light incident thereon and a storage part arranged to store the electric charge coming from the photo-electric converting part. The storage part consists of a first storing part which stores an electric charge obtained while a light is projected from a light emitting means, a second storing part which stores an electric charge obtained while no light is projected from the light emitting means and a gate part arranged to control the signal inputs and outputs of the first and second storing parts. The light receiving means is arranged such that: The gate means is controlled on the basis of signals from the storage part to give a distance measurement signal by removing a noise signal from the output signal of the light receiving means, so that a distance to a distance measuring object can be accurately measured by virtue of the distance measurement signal.

Another object of the invention is to provide the following arrangement to ensure that the above-stated light receiving means produces a correct distance measurement signal: A warning is arranged to be produced to inhibit a photo-taking operation when the distance measurement signal is incorrect, so that the photo-taking operation can be prevented from being carried out under an incorrect condition.

A further object of the invention is to provide a photo-electric conversion device comprising a photo-electric converting means arranged to receive a reflection light resulting from light emission made by light emitting means which continuously performs a light emitting operation and a reflection light resulting from an ambient light; storing means arranged to store signals produced from the photoelectric converting means; and pulse control means arranged to produce control pulses which cause the storing means to perform a storing action during the light emitting operation and another storing action during a period in which no light is emitted from the light emitting means. The conversion device is thus arranged to perform a clearing action on the storing means after the lapse of each storing period of time in a sequential manner.

These and further objects and features of the invention will become apparent from the following detailed description of the preferred embodiments thereof taken in connection with the accompanying drawings.

BRIEF DESCRIPTION OF THE DRAWINGS

FIGS. 1(a), 1(b) and 1(c) are illustrations of photo-electric converting means of the storage type to be used for projection light quantity control device according to the present invention.

FIGS. 4, 5 and 6 are timing charts showing the operations of the essential parts of FIG. 3.

DETAILED DESCRIPTION OF THE PREFERRED EMBODIMENTS

FIGS. 1(a), 1(b) and 1(c) are illustrations conceptionally showing photo-electric converting means of the storage type used for a projection light quantity control device according to the present invention. Of these drawings, FIG. 1(a) shows the amounts of electric charges A and B generated at two photo-electric conversion parts A1 and B1 by light reflected from a photographic object as a result of light projected from a light source and other amounts of electric charges A0 and B0 generated by ambient light when the light is not projected. The sums of the amounts of electric charges A+A0 and B+B0 are supplied from the photo-electric conversion parts A1 and B1 to respective first and second electric charge storing parts A2 and B2 to be stored there. Meanwhile, the electric charges A0 and B0 generated at the photo-electric conversion parts A1 and B1 when the light is not projected are stored respectively at third and fourth electric charge storing parts A3 and B3. Then, the difference between these stored electric charges are obtained by a differential circuit to detect only the amounts A and B of the electric charges representing only the reflected light components resulting from the projected light as shown in FIG. 1(b). Referring to FIG. 1(c), the lens system used for distance measurement is considered to be in an in-focus position when the two electric charge amounts A and B are equal to each other; to be in a near-focus position when they have the relation of A>B; and to be in a far-focus position when they are related by A<B. In this instance, if the amount of electric charge A+B is arranged to be kept at a constant value, the slope in the proximity of the in-focus position of A−B becomes almost unvarying, so that the focusing accuracy can be kept unvarying by such arrangement.

Figure 2:
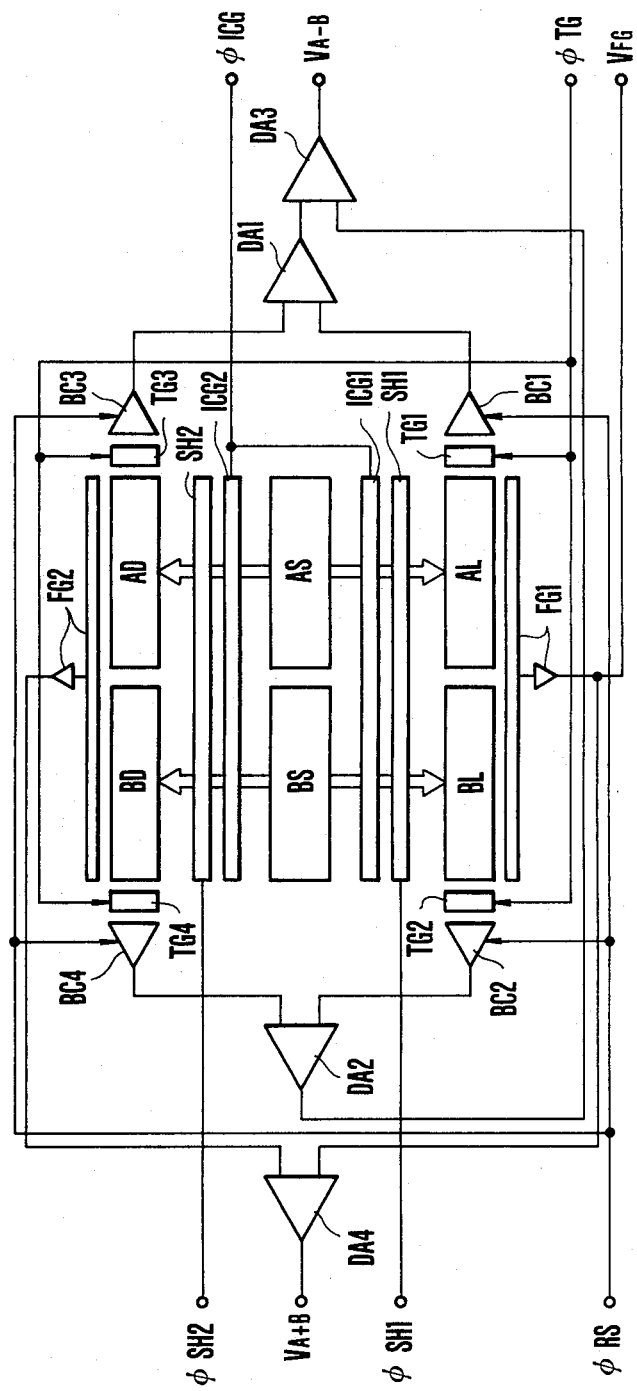
FIG. 2 is a schematic illustration of an embodiment of photo-electric converting means arranged according to the invention.

FIG. 2 shows an embodiment of the photo-electric converting means of the storage type usable in accordance with this invention. The converting means includes first and second photo-electric conversion parts AS and BS; first and second electric charge storing parts AL and BL each of which is arranged to store the sum of a reflection light resulting from light projection and a reflection light resulting from an ambient light during the light projecting operation; third and fourth electric charge storing parts AD and BD which store the ambient light during a period when no light is projected; integration clearing gates ICG1 and ICG2 which clear the electric charges produced from the photo-electric conversion parts AS and BS when control pulses $\phi$ICG are at a high level; and electric charge transfer gates SH1 and SH2 which allow the electric charges produced from the photo-electric conversion parts AS and BS to be stored at the electric charge storing parts AL and BL when control pulses $\phi$SH1 is at a high level and to be stored at the electric charge storing parts AD and BD when control pulses $\phi$SH2 is at a high level. Electric charge transfer gates TG1–TG4 are arranged to transfer the electric charges stored at the electric charge storing parts to electric charge-to-voltage conversion parts BC1–BC4 to permit a signal read-out operation when a signal $\phi$TG is at a high level. A signal representing A+A0 of FIG. 1(a) is produced from the conversion part BC1. A signal representing B+B0 is produced from the conversion part BC2. A signal representing A0 is produced from the conversion part BC3 and a signal representing B0 from another conversion part BC4. Then, a signal representing $(A+A0)-(A0)=A$ is produced via a differential amplification circuit DA1; a signal representing $(B+B0)-(B0)=B$ via differential amplification circuit DA2; and a signal VA-B representing A−B via a differential amplification circuit DA3. Further, electric charges $(A+A0)+(B+B0)$ and $A0+B0$ which are stored at the electric charge storing parts AL and BL and the electric charge storing parts AD and BD are read out nondestructively via floating gates FG1 and FG2. A signal VA+B representing $(A+A0)+(B+B0)-(A0+B0)=A+B$ is then produced via a differential amplification circuit DA4. A signal read-out operation is performed when this output VA+B reaches a reference value.

After completion of signal read-out detection, a signal $\phi$RS becomes high and clears level and to clear unnecessary signals.

Figure 3A:
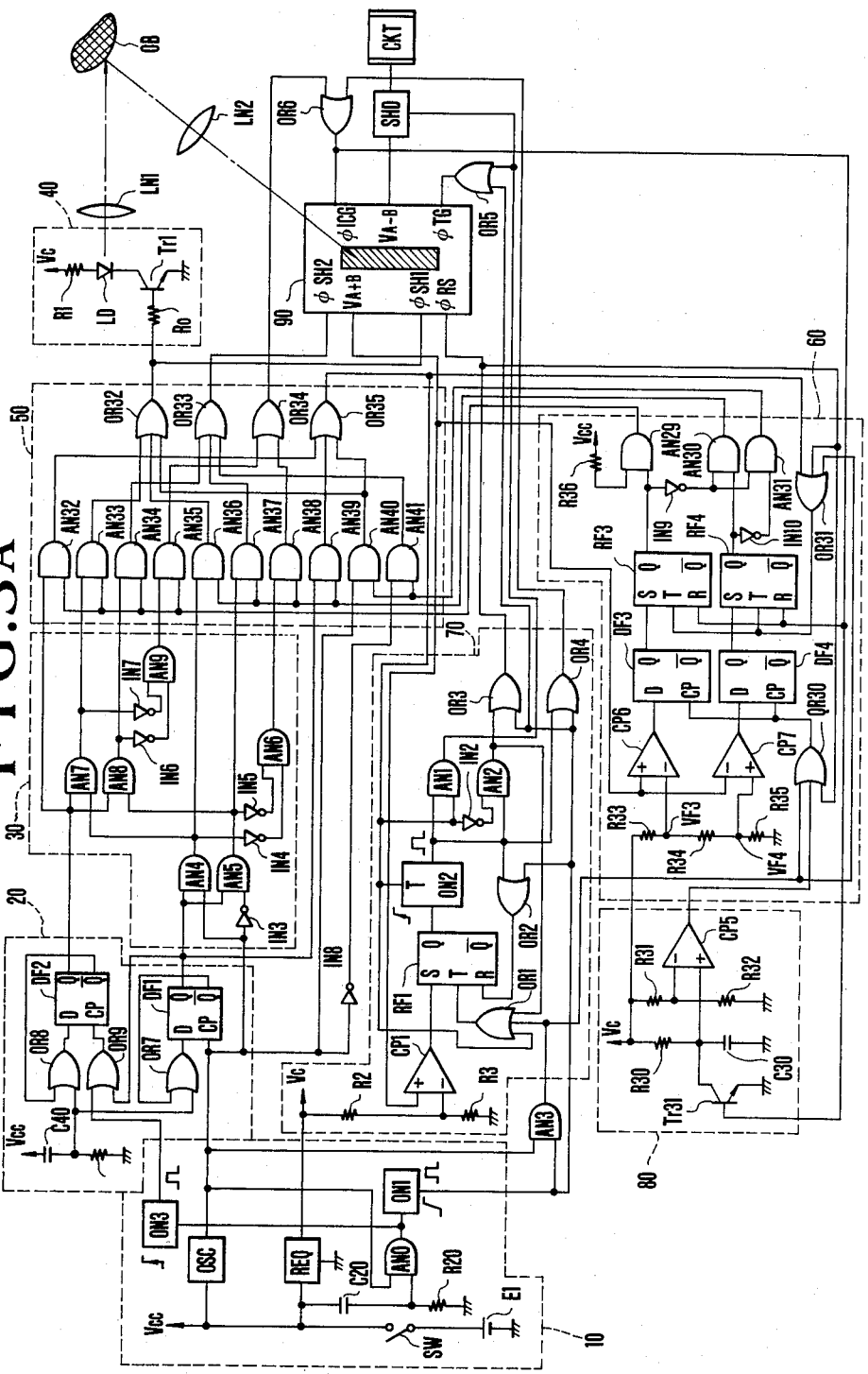
FIG. 3A is a circuit diagram showing by way of example an electric circuit to be used for driving the photo-electric converting means according to the invention.
Figure 5:
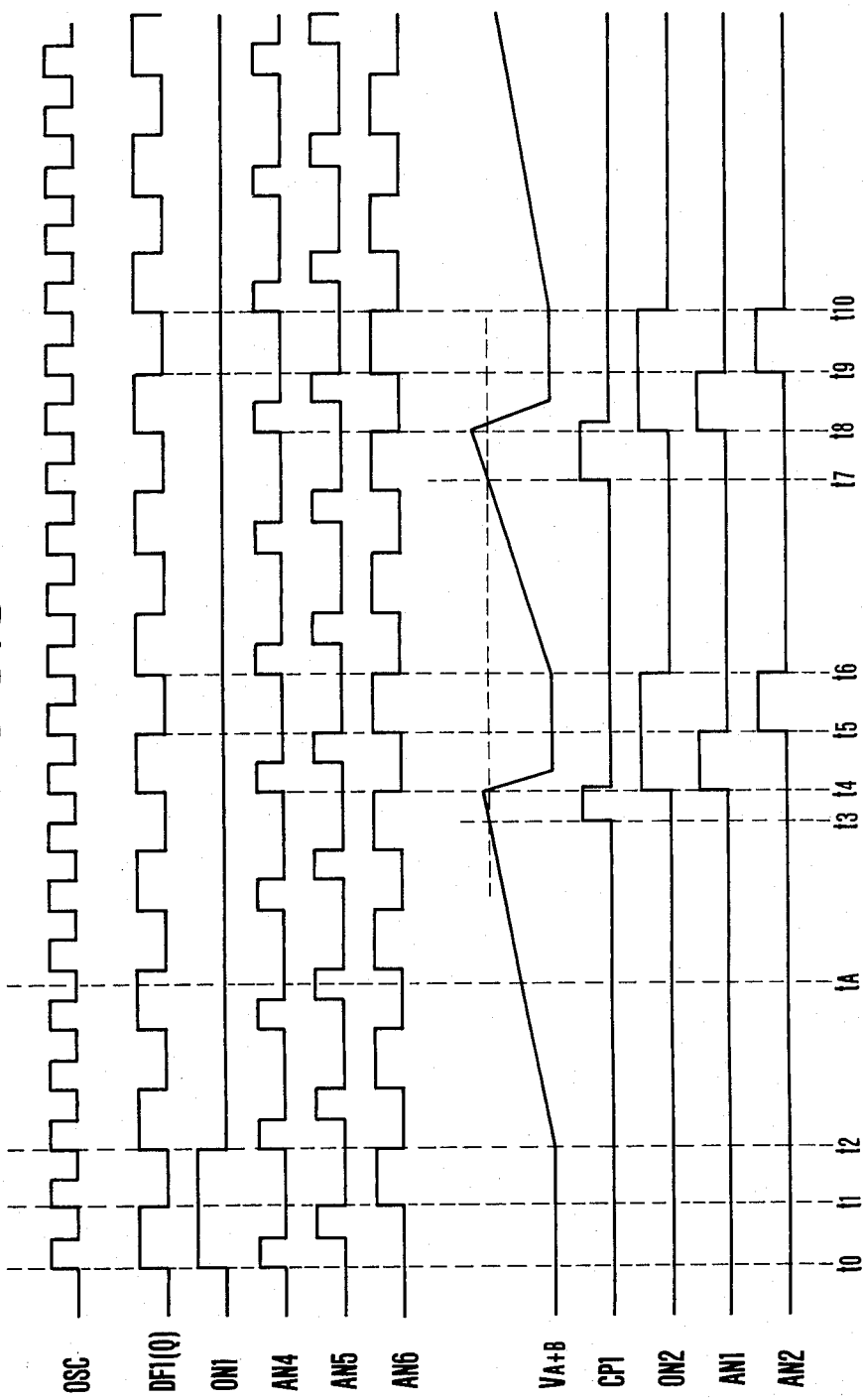

FIG. 3A shows an electric circuit for driving the light receiving means shown in FIG. 2. FIGS. 4 and 5 are timing charts showing the signals produced from the essential parts of the above-stated electric circuit. Referring to these drawings, a block 10 represents a start circuit. When a start switch SW is closed at a point time t0, power supply is effected from a power source E1 to a time constant circuit (consisting of a capacitor C20 and a resistor R20), a constant voltage generation circuit REQ and an oscillator OSC. The oscillator then oscillates in a manner as shown at (a) in FIG. 4. A constant voltage Vc is produced from the constant voltage circuit REQ. Concurrently with that, in synchronism with a pulse rise of the output of the oscillator OSC, the output level of an AND gate AN0 becomes and remains at a high level (H) for a short period of time determined by the above-stated time constant circuit C20 and R20. This causes a one-shot circuit ON1 to produce a one-shot pulse as shown at (b) in FIG. 4. The signals of the elements ON1 and OSC cause an AND gate AN3 to produce a signal as shown at (c) in FIG. 4 to reset thereby an RST flip-flop RF1. Further, the output terminal of the one-shot circuit ON1 produces an integration clearing signal $\phi$ICG via OR gates OR3, OR4 and OR5. This signal clears the electric charges stored at the first–fourth electric charge storing parts shown in FIG. 2 during a period between the points of time t0 and t2.

In FIG. 3A, a block 20 represents an initial set circuit. The set circuit 20 includes a D flip-flop DF1 which is initially set in synchronism with a rising pulse of the oscillator OSC for a period of time determined by a time constant circuit consisting of a capacitor C40 and a resistor R40. Further, a one-shot pulse is generated from a one-shot circuit ON3 in synchronism with the rise of the output of the AND gate AN0. Then, in synchronism with this pulse, another D flip-flop DF2 is initially set.

Figure 6:
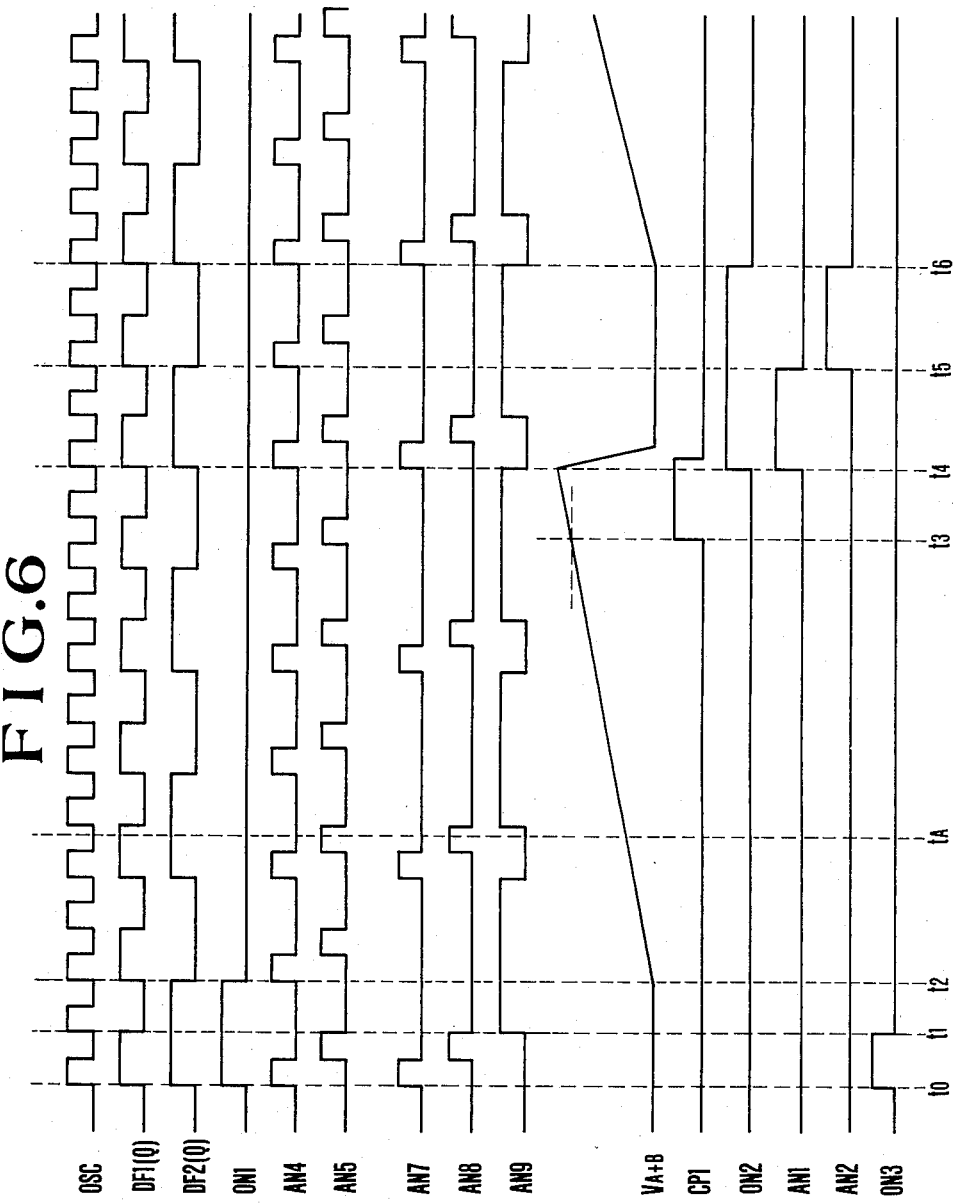

A conversion circuit 30 responds initial set circuit 20 to change the duty ratios of the light projecting time of a light emitting element LD of a light emitting means 40, to change a no light projecting time, and to change clearing operation time for clearing the above-stated electric charges stored at the storing parts. The conversion circuit 30 consists of AND gates AN4–AN9 and inverters IN3–IN7. The AND gate AN4 is arranged to receive signals from the flip-flop DF1 and the oscillator OSC and to produce a signal AN4 as shown in FIG. 5. The AND gate AN5 is arranged to receive the signal of the flip-flop DF1 and the signal of the oscillator OSC which has been inverted via the inverter IN3. The AND gate AN5 then produces a signal AN5 as shown in FIG. 5. The AND gate AN6 is arranged to receive the outputs of the AND gates AN4 and AN5 after these output signals are inverted respectively by inverters IN4 and IN5 and produces a signal AN6 as shown in FIG. 5. The AND gate AN7 receives the signals produced from the flip-flop DF2 and the AND gate AN4 and produces a signal AN7 as shown in FIG. 6. The AND gate AN8 receives the signals produced from the flip-flop DF2 and the AND gate AN5 and produces a signal AN8 as shown in FIG. 6. The AND gate AN9 receives signals which are produced AND gates AN7 and AN8 and are inverted respectively by inverters IN6 and IN7 and then produces a signal AN9 as shown in FIG. 6. The AND gates AN6 and AN9 are basic gate means for producing a signal for a clearing period of unnecessary information.

A block 50 represents a control pulse generation circuit which is arranged to produce pulses for controlling light emitting means 40 and light receiving means 90. The control pulse generation circuit 50 consists of AND gates AN32–AN41 and OR gates OR32–OR35. The OR gate OR32 is arranged to receive signals produced from the AND gates AN33, AN36 and AN40 and to produce at a high level the transfer pulses $\phi$SH1 to allow the electric charges to be transferred from the photo-electric conversion parts AS and BS to the first and second electric charge storing parts AL and BL during the light projecting operation of the light emitting means 40 in synchronism with the light projecting time. The AND gates AN33, AN36 and AN40 which are respectively arranged to supply inputs to the OR gate OR32 receive signals from AND gates AN7, AN4 and AN31. (The AND gate AN31 is included in an electric charge amount determining circuit 60.) The AND gate AN4 is set at a duty ratio of 20% of one period of the output pulses of the flip-flop DF2 for light projection, the AND gate AN7 at 12.5% and the AND gate AN31 at 50%. Therefore, the OR gate OR32 is thus arranged to change the duty ratio of the light projecting time of the light emitting means 40 according to the high and low levels of signals coming from these AND gates AN33, AN36 and AN40. The OR gate OR33 is arranged to receive the pulses from the AND gates AN34, AN37 and AN41 and thus sets the timing for the no light projecting time of the light emitting means to control the shift pulse $\phi$SH2 accordingly. The OR gate OR34 receives pulses from the AND gates AN35 and AN38 and is arranged to clear the electric charges stored at the electric charge storing parts AL, BL, AD and BD in synchronism with the timing of the signals produced from the AND gates AN6 and AN9 of the above-stated conversion circuit 30. The timing for generation of the clear gate pulse $\phi$ICG defined by the OR gate OR34 is arranged to come after the lapse of the no light projecting time of the light emitting means (the timing of the signals AN5 and AN8) as shown by the pulse waves of the signals AN6 and AN9 in FIGS. 5 and 6.

The OR gate OR35 receives the pulses produced from the AND gates AN32, AN39 and AN40 and is arranged to produce a storing time completion signal therefrom.

A block 60 represents the electric charge storing amount detection circuit which comprises resistors R33, R34 and R35, comparators CP6 and CP7, D flip-flops DF3 and DF4, RST flip-flops RF3 and RF4, OR gates OR30 and OR31, inverters IN9 and IN10 and AND gates AN29, AN30 and AN31. During a period between time t0 and time t2, the pulse which is produced from the above-stated AND gate AN3 initially sets the flip-flops DF3 and DF4 via the OR gate 30 and resets the flip-flops RF3 and RF4 via the OR gate OR31. The above-stated sum signal VA+B from the light receiving means 90 is supplied to one input terminal of each of the comparators CP6 and CP7. Meanwhile, other input terminals of the comparators CP6 and CP7 are arranged to receive reference voltages VF3 and VF4 which are divided by the resistors R33, R34 and R35. When the sum signal VA+B is lower than the reference values VF3 and VF4, the AND gates AN29 and AN30 produce low level signals and the AND gate AN31 a high level signal. When the sum signal VA+B is higher than the reference value VF4, the output level of the comparator CP7 becomes high and that of the flip-flop DF4 also becomes high. Then, the flip-flop RF4 is set. The output level of the AND gate AN30 becomes high and that of the AND gate 31 is inverted by the inverter IN10 to become a low level. In case that the sum signal VA+B is higher than the reference value VF3, the output levels of the comparators CP6 and CP7 become high. The output levels of the Q outputs of the flip-flops DF3 and DF4 then change to high levels in synchronism with the rise of the output of a comparator CP5 of a timer circuit 80. The flip-flops RF3 and RF4 are set in synchronism with the rise of the signal OSC and the AND gate AN29 then produces a high level signal. The outputs of the AND gates AN30 and AN31 are inverted by the inverters IN9 and IN10 into low level signals.

The electric charge storing amount detection circuit 60 thus receives the sum signal VA+B of the light receiving means 90. Then, the output levels of the AND gates AN29, AN30 and AN31 are selected according to the electric charge amount stored within a predetermined period of time. The signals produced from the AND gates AN29, AN30 and AN31 are then supplied to the above-stated AND gates AN33, AN36 and AN40 of the control pulse generating circuit 50. As a result of this, the oscillation duty ratio of the light emitting element LD of the light emitting means 40 varies to become, for example, 12.5%, 25%, 50%, etc. according to the stored amount of electric charge of the sum signal VA+B of the light receiving means.

A block 70 represents a pulse generation circuit which produces reset pulses $\phi RS$, read-out pulses $\phi TG$ and integral clearing pulses $\phi ICG$. The sum signal VA+B arrives at one of the input terminals of a comparator CP1. Meanwhile, a reference value signal which is voltage divided by resistors R2 and R3 comes to the other input terminal of the comparator CP1. When the sum signal VA+B is higher than a predetermined value, a flip-flop RF1 is set by the output of the comparator. Then, the Q output of the flip-flop RF1 causes a one-shot circuit ON2 to produce a one-shot pulse therefrom. The one-shot pulse signal and the signal of the OR gate 35 are supplied to an AND gate AN2. This causes the reset pulse $\phi RS$ to be produced via an OR gate OR3. The read-out pulse $\phi TG$ is produced via an OR gate OR5. The integral clearing pulse $\phi ICG$ is produced via an OR gate OR6.

Figure 3B:
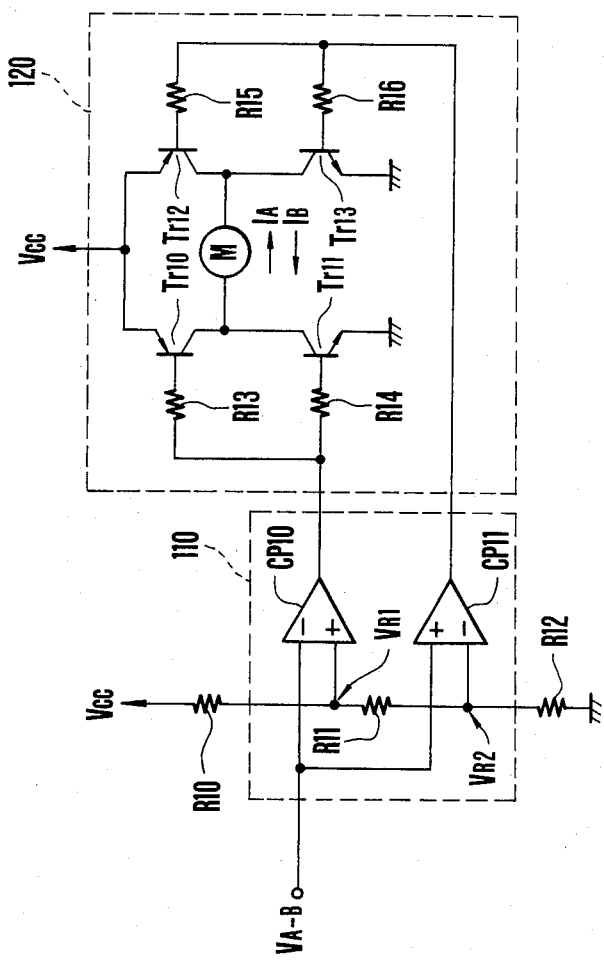
FIG. 3B is a circuit diagram showing a focussing control circuit.

A block 80 represents the timer circuit and another block 90 the light receiving means shown in FIG. 2. A sample-and-hold circuit SHD is arranged to sample and hold the signal VA−B produced from the light receiving means 90. A control circuit CKT is arranged to measure a distance to an object on the basis of the above-stated signal VA−B and to generate a driving signal for shifting a photo-taking lens to an in-focus position. The arrangement of the control circuit CKT is as shown by way of example in FIG. 3B. In FIG. 3B, a block 110 represents a window comparator which is arranged to operate according to the signal VA−B. Another block 120 represents a motor driving circuit which includes a motor M. The motor M is connected to a lens carrying member which is provided for a focusing lens.

The circuit of FIG. 3B is arranged as follows: The lens is considered to be an in-focus position when the value of the signal VA−B is between the values VR1 and VR2 shown in FIG. 1(c). In the event of VA−B>VR1, the motor M is allowed to rotate to the right to bring the focusing lens to the in-focus range. In the event of VA−B<VR2, the motor is arranged to rotate to the left. If the value of the sum signal VA−B is between the values VR1 and VR2, the outputs of the comparators CP10 and CP11 become high level signals to turn on only transistors Tr11 and Tr13. The motor does not rotate and the lens remains in an in-focus position. In the event of VA−B>VR1, the output of the comparator CP10 becomes a low level signal and that of the comparator CP11 a high level signal. Then, transistors Tr10 and Tr13 turn on to cause a current to flow in the direction of IA as shown in the drawing and the motor M to rotate accordingly. In case of VA−B<VR2, the output of the comparator CP10 becomes a high level signal and that of the comparator CP11 a low level signal. Transistors Tr11 and Tr12 then turn on to cause the current to flow in another direction of IB and the motor M to rotate accordingly.

The circuit which is arranged as shown in FIG. 3A operates as follows: As shown in FIG. 4, the output of the one-shot circuit ON1 changes to a low level at a point of time t2. When the signal produced from the OR gate OR32 is at a high level, the light emitting means 40 alternately repeats a light projecting action on the object OB and no light projection through a light projection lens LN1. A reflection light comes from the object OB to the photo-electric conversion parts of the light receiving means 90. The electric charges which are produced at the photo-electric conversion parts AS and BS by the incident light received at the time of light projection are caused to be stored at the first and second electric charge storing parts AL and BL by the shift gate pulse $\phi SH1$ through the shift gate SH1. The electric charges produced by the incident light which is received at the time of no light projection are caused to be stored at the electric charge storing parts AD and BD by the shift pulse $\phi SH2$ through the shift gate SH2.

In the electric charge storing operation performed at the time of light projection by the light emitting means, the output signal of the OR gate OR32 which controls the light emitting means 40 in an oscillating manner comes via the gate SH1 as the shift pulse $\phi SH1$. The electric charges stored at the electric charge storing parts AL, BL, AD and BD are supplied via the floating gates FG1 and FG2 and the electric charge transfer gates TG1-TG4 to the differential amplifiers DA1--DA4. The differential amplifiers DA1-DA4 then produce the sum signal VA+B and the difference signal VA−B. At the time t2, the light receiving means 90 begins to store the electric charges. The above-stated sum signal VA+B is supplied to one of the input terminals of each of the comparators CP6 and CP7 which form the electric charge storing amount determining circuit. The electric charge storing amount determining circuit or electric charge storing amount detecting means 60 then compares the sum signal VA+B with the reference values VF3 and VF4. In this comparing operation, the high level output of the clear gate OR6 is supplied to the base terminal of the transistor Tr31 of the timer circuit 80 to turn on the transistor. With the transistor Tr31 thus turned on, the comparator CP5 comes to produce a high level signal after the lapse of a period of time tA which is determined by the time constant circuit consisting of the capacitor C30 and a resistor R30. This comparator output signal then renders via the OR gate OR30 the electric charge storing amount detection circuit 60 operative.

The value of the sum signal VA+B produced from the light receiving means 90 is determined according to the received quantity of the reflection light resulting from the light projection. Accordingly, the outputs of the AND gates AN29, AN30 and AN31 which are the output signals of the electric charge storing amount detecting means 60 are also determined by the quantity of light received. Then, the light emitting period of the light emitting means 40 is automatically selected according to the amount of electric charge stored within a predetermined electric charge storing time. In other words, where the quantity of the incident light is small and the value of the sum signal VA+B produced by the light receiving means 90 within the predetermined electric charge storing time is also small, the AND gate AN31 which is one of the output gates of the electric charge storing amount detecting means 60 alone produces a high level output Meanwhile, other AND gates AN 29 and AN30 produce respective low level outputs.

The signal thus produced from the AND gate AN31 is supplied via the AND gate AN40 to the OR gate OR32. In the meantime, the other input terminal of the AND gate AN40 has the signal OSC supplied thereto. Therefore, the light emitting element LD keeps on emitting the light in a duty ratio of 50% as long as the AND gate AN31 of the electric charge detecting means 60 is producing the high level signal. Further, when the sum signal VA+B exceeds the reference value of the comparator CP1, the comparator CP1 produces a comparison output CP1 at a point of time t3 as shown in FIG. 4. Then, at a next time t4, the one-shot circuit ON2 produces a one-shot pulse, which causes the signal $\phi$ICG to become a high level via the OR gate OR4. With the signal $\phi$ICG going high, the storing operation of the light receiving means comes to an end. At that instant, the level of the signal $\phi$TG is caused to become high via the OR gate OR5 and the stored information is read out. Then, the sample-and-hold circuit SHD samples and holds the information of VA−B during a period of time between time points t4 and t5. During a period between points of time t5 and t6, the level of the signal $\phi$RS is caused to become high via the AND gate AN2, the inverter IN2 and the OR gate OR3. The high level signal $\phi$RS clears the unnecessary electric charges stored at the electric charge-to-voltage conversion part. Then, new image information begins to be stored at the point of time t6.

Further, the output of the AND gate AN2 resets the flip-flop RF1 at the point of time t5 and the rise of the signal $\phi$RS resets the flip-flops RF3 and RF4 while other flip-flops DF3 and DF4 are initially set. During a period between times t6 and t10, image information is detected in the same manner as during the period between the points of time t0 and t6. The new image information is sampled and held during a period between the points of time t8 and t9. The information sampled and held by the sample-and-hold circuit SHD is used for driving the photo-taking lens to an in-focus position thereof.

Where the duty ratio of light emission synchronization is 50%, when a light receiving operation is resumed at the time t10, the light receiving means produces the signal VA+B according to the quantity of the incident light if the quantity of light incident on the photo-electric conversion part of the light receiving means 90 is large. The signal VA+B is then supplied to the comparators CP6 and CP7 of the electric charge storing amount detecting means 60 to be compared with the above-stated reference signals VF3 and VF4 there. As a result of this comparison, the output level of the AND gate AN29 or AN30 becomes high according to the amount of the stored electric charge. The AND gates AN29 and AN30 are connected to the AND gates AN33 and AN36 of the control pulse generation circuit 50. Meanwhile, the AND gates AN33 and AN36 are arranged to have the signals produced from the AND gates AN7 and AN4 supplied thereto. When the quantity of the incident light is large, therefore, the light emission duty ratio of the light emitting means comes to change in synchronism with the pulse period of the AND gate AN4 or AN7.

Figure 7:
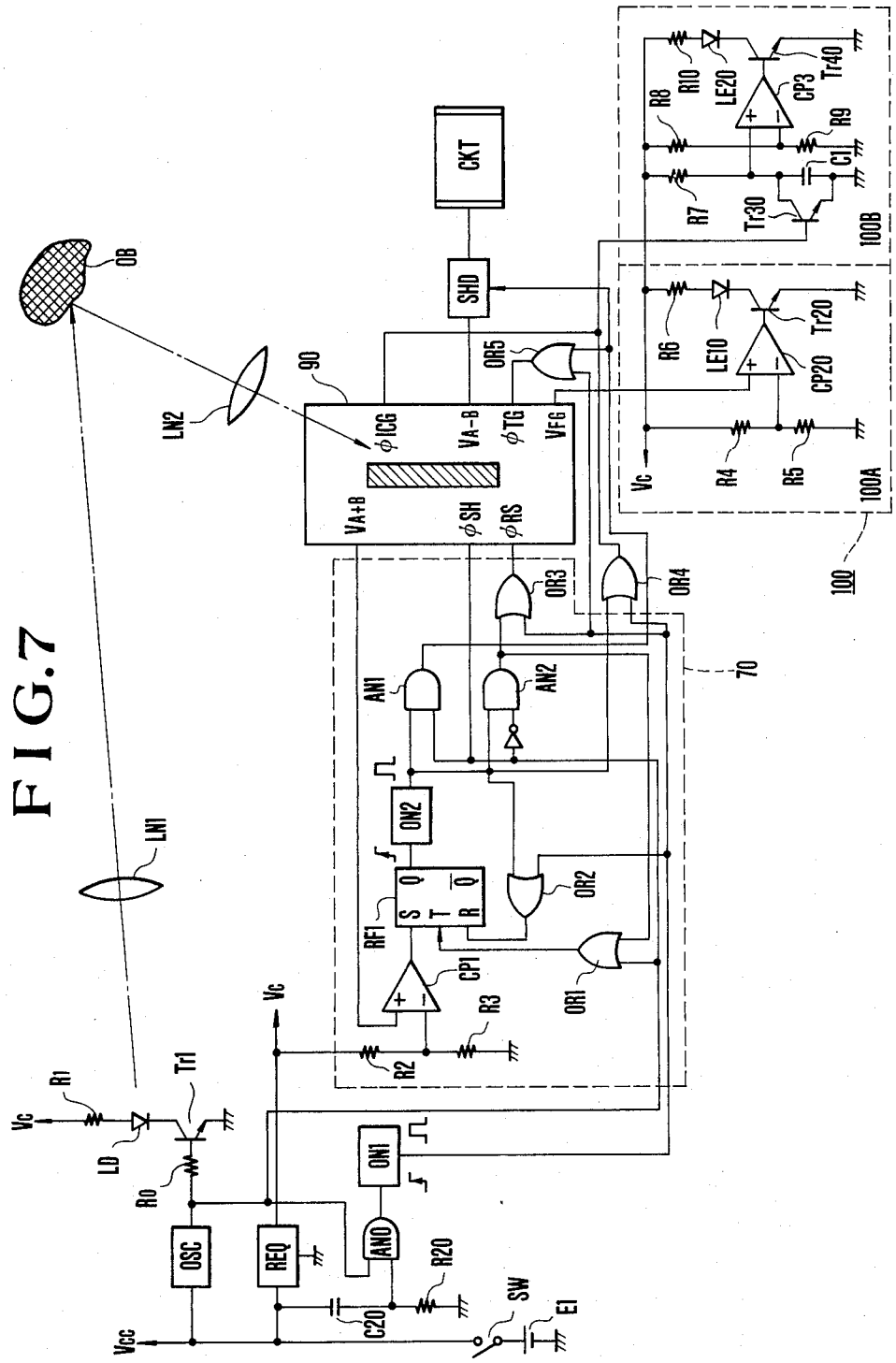
FIG. 7 is a circuit diagram showing arrangement of warning means added to the distance measuring device of the invention to give a warning when the device is incapable of measuring the distance.

FIG. 7 is a circuit diagram showing by way of example a modification of the embodiment described in the foregoing. In the case of the embodiment shown in FIG. 7, a circuit block 100 is connected to the driving circuit of the light receiving means of FIG. 3 for the purpose of providing warning means. The warning means 100 includes a first warning means 100A which consists of resistors R4, R5 and R6, a comparator CP20, a transistor Tr20 and a light emitting element LE10. The first warning means 100A is arranged to give a warning against an inadequate light receiving condition in cases where an object is located at a long distance within a bright ambient light and thus resulting in a weak reflection light. More specifically, the operation of the first warning means 100A is as follows: During light projection by the light emitting means, the floating gate signal VFT of the electric charge storing parts AL and BL is supplied to the comparator CP20. In the event of a weak reflection light due to a bright ambient and a long object distance, or in the case of a small stored amount signal representing the reflection light component resulting from light emission from the light emitting means, the signal VFG shown in FIG. 2 is compared with a divided voltage obtained via the resistors R4 and R5. The transistor Tr20 then causes the light emitting element LE10 to light up to give the warning.

The warning means 100 further includes a second warning circuit 100B. The second warning circuit 100B consists of resistors R7, R8, R9 and R10, transistors Tr30 and Tr40, a capacitor C1, a comparator CP3 and a light emitting element LE20. The circuit 100B gives a warning when the operation sequence of the driving circuit (see FIG. 3A) is not performed within a predetermined period of time. More specifically stated, the circuit 100B operates as follows: In case the sum signal VA+B which represents a stored amount is not produced within a period of time determined by the resistor R7 and the capacitor C1, a comparison signal is applied to the comparator CP3 after the lapse of the charging time of the capacitor C1. This causes the comparator CP3 to render the transistor Tr40 conductive. The transistor Tr40 then causes the light emitting element LE20 to light up to give a warning that the quantity of light incident on the photo-electric conversion part within the predetermined period of time is insufficient. Conversely, in the event of sufficient quantity of incident light within the predetermined period, the pulse produced from the one-shot circuit ON2 of the set pulse generation circuit 70 causes the OR gate OR4 to produce a high level signal. It renders the transistor Tr30 conductive to make the time constant circuit R7 and C1 inoperative and thus prevents the light emitting element LE20 from operating.

Figure 8:
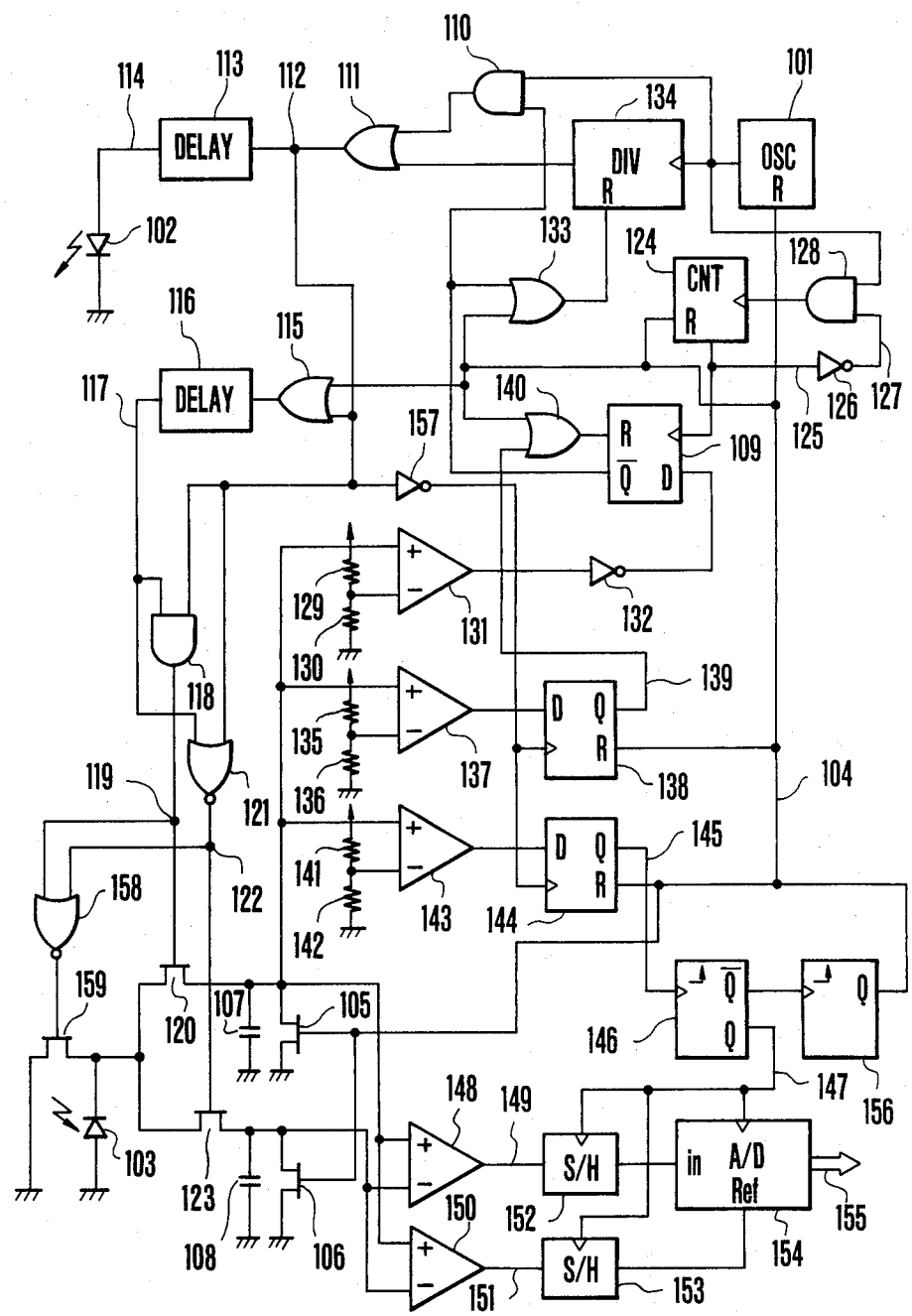
FIGS. 8 and 9 illustrate another embodiment of the invention, FIG. 8 being a circuit diagram showing a circuit for converting the oscillation frequency of light emitting means and FIG. 9 being a timing chart showing the operation of the circuit of FIG. 8.
Figure 9:
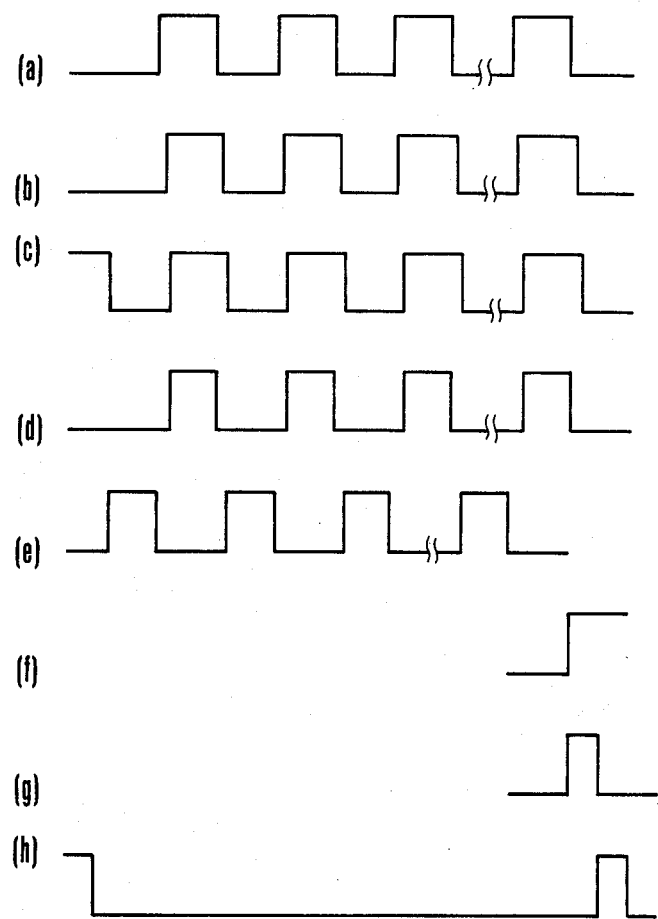

FIG. 8 shows the control circuit of another embodiment of the invention and FIG. 9 the wave forms of the main outputs of the control circuit. As mentioned in the foregoing with reference to FIGS. 1 and 2, there is a shortcoming of the prior art this occurs in carrying out a signal processing operation according to received light quantity with a light received by a photo-electric conversion element if the osciallation frequency of a light flux projected from a light source is high, the length of a dead time increases due to the transiency of a selection (or detection) circuit of a subsequent signal processing circuit. In the event of low frequency on the other hand, saturation takes place within the cycle of selection. Whereas, this embodimen affords a projection light quantity control device which uses a storage type photo-electric conversion element and permits light measurement with high degrees of sensitivity and accuracy. The embodiment includes a light emitting element 102 which is under control of an oscillator 101. A light projected from the light emitting element 102 is reflected by an object to be photographed. The light reflected by the object is received by a photo-electric conversion element 103. In this embodiment, the quantity of the reflected light is normalized with the quantity of an ambient light flux incident on the photo-electric conversion element coming from external light around the element. The reflection light quantity is thus computed in relation to the external light quantity. Referring to FIG. 8, when the level of a line 104 changes from a high level to a low level as shown at (h) in FIG. 9 and is thus released from a reset state, the photo-electric information stored at elements and 108 and coming through gates 105 and 106 is released from a cleared state and the oscillator 101 begins to oscillate. Since a D flip-flop (or D-FF) 109 is in a reset state at that time, the ,ovs/Q/ output thereof is at a high level. This allows the output of the oscillator 101 to be supplied to a line 112 via an AND gate 110 and an OR gate 111. This signal is somewhat delayed by a delay circuit 113 as shown at (b) in FIG. 9 before it is supplied to a line 114. This causes a light emitting element, 102 to emit and project a pulse light. A reflected light resulting from the projeced light and an ambient or external light is received by a photo-electric conversion element 103. The element 103 then selectively stores an external light component (received when no light is projected) and a composite light consisting of an external light component and a reflection light component (obtained at the time of light projection). To eliminate the response delay, etc. of elements employed, the embodiment is arranged as follows:

A signal which is shown at (c) in FIG. 9 and is delayed to come later than the light projecting timing of the line 114 is produced by a delay circuit 116 via an OR gate 115 to the line 117 as shown in FIG. 8. This signal then in conjunction with the signal of the line 112 permits an integrating action to be performed on photo-electric conversion at a correct timing which eliminates the transient period of the light projection timing of the line 114. More particularly, an AND gate 118 is arranged to take a logical product of the lines 112 and 117 to obtain a sample gate signal, for the operation performed at the time of light projection, as shown at (d) in FIG. 9. Then, a photo-electric converted value obtained at the photo-electric conversion element 103 is supplied via a gate 120 to a storing part 107 for addition (or integration). Further, a NOR gate 121 is arranged to take an inverted logical sum of the lines 112 and 117 to obtain a sample gate signal, for the operation performed at the time of no light projection, as shown at (e) in FIG. 9. Then, a photo-electric converted value obtained at the element 103 is supplied via a gate 123 to a storing part 108 for addition (or integration). The selective storing operation is performed at such a high frequency that the selective storing operation can be completed in a cycle immediately before saturation. In other words, saturation can be easily prevented from occurring before the end of the cycle of no light projection and light projection. Further, where the total number of cycles is arranged to be large, any fractional error may be ignored even if the operation is suspended during a cycle. This is an advantage. However, a disadvantage of such an arrangement resides in the reactive transient time increasing in that instance. The ratio of the advantage to the disadvantage hinges greatly on the quantity of the incident light resulting from an external light, etc. Therefore, in the case of this embodiment, a suitable frequency is selected by changing frequency by initially resetting a counter 124 and by detecting a stored level reached after a predermined number of cycles, i.e. after the lapse of a predetermined time as counted by the counter. At the beginning, since the counter 124 is reset, the level of a line 125 is low. Therefore, the level of a line 127 which is for the output of an inverter 126 is high. An AND gate 128 is therefore opened to permit the counter 124 to begin to count in response to the output of the oscillator 101. Then, after a predetermined number of counting times, the level of the line 125 becomes high to close the AND gate 128 and a signal representing a timing for detecting or determining the stored level. At this time, if the integration by the storing part 107 has not reached a low reference voltage defined by resistors 129 and 130, the output of a comparator 131 is at a low level. The low level signal produced from the comparator 131 is then inverted by an inverter 132 and is supplied as a data input to the D-FF 109. The D-FF 109 is thus set when a predetermined level is not attained before the end of a predetermined time. Then, the level of the $\overline{Q}$ output of the D-FF becomes low to close an AND gate 110 which is for a light projection clock of fast cycles. The output level of an OR gate 133 then becomes low to release a frequency divider 134 from a reset state. Then, a slower clock is applied by this frequency divider 134 via an OR gate 111. In this instance, therefore, control over light projection and receiving actions is thus carried out at slower cycles which have less reactive time. However, since the slow cycles tend to bring about saturation, a comparator 137 is arranged to compare the stored amount with a relatively high reference level defined by resistors 135 and 136. Then, when the stored amount reaches a relatively high level, a signal representing detection of this is supplied to a D-FF 138 in synchronism with the light projecting cycle. In that event, the level of a line 139 which is for the Q output of the D-FF 138 becomes high to reset the D-FF 109 via an OR gate 140. As a result of that, the slow light projection cycle which has been brought about by the high level $\overline{Q}$ output of the D-FF 109 is cancelled and shifted to faster light projecting and receiving cycles to ensure that the storing process comes to an end in agreement with a photo-electric storing cycle immediately before saturation.

Attainment of a sufficient stored amount immediately before saturation is detected with the amount compared by a comparator 143 with a determining level obtained through resistors 141 and 142. Upon detection of it, the comparator 143 produces a high level output as information. This information is received by a D-FF 144 which operates in synchronism with the light projecting and receiving cycle. The Q output of the D-FF 144 is produced to make the level of a line 145 high as shown at (f) in FIG. 9. The storing process then comes to an end.

A signal representing this is received by a monostable multivibrator 146, where Q output terminal then applies 1 a signal as shown at (g) in FIG. 9 to a line 147. Then, the storage information thus obtained is subjected to computation.

More specifically, a reflected light quantity value is obtained by subtracting an external light portion from the sum of the external light and reflected light at a differential amplifier 148. The reflected light quantity value thus obtained is produced to a line 149. Meanwhile, an adder 150 produces to another line 151 chiefly an external light component obtained by adding an external light quantity to the sum of the external light and the reflection light. These signal outputs are sampled and held by sample-and-hold circuits 152 and 153 according to the above-stated signal of the line 147. The two signals thus obtained are supplied to the input terminal and the reference input terminal of an A/D converter 154. The ratio of these inputs is produced in a digital value from the converter 154 and supplied to a line 155. After the above-stated data sampling, the change of the $\bar{Q}$ output of the monostable multivibrator 146 from a low level to a high level gives a reset pulse as shown at (h) in FIG. 9 to bring the system back to the initial state thereof. Further, an inverter 157 is provided for the purpose of making the clock of the D-FF's 138 and 144 coincide with the timing of the light projecting and receiving cycle.

In the embodiment described, it is possible to clear the photo-electric information obtained during the reactive time by obtaining a signal at a non-sampling time by means of a NOR gate 158 and by turning on and off a gate 159 to clear the photo-electric output thereby. The output computation may be carried out on the basis of the ratio to or difference from other signals according to the purpose.

As to the photo-electric conversion, use of a photo transistor is advantageous as it facilitates the preparation of a selection mechanism by virtue of its shape and shortens the reactive time.

In accordance with this invention, as has been described in the foregoing, the arrangement to selectively change the oscillating frequency of the light projecting light source permits reduction in the reactive time and facilitates the control over the storing process according to the light projecting and receiving cycle before saturation, so that a light projecting quantity control device capable of giving a signal of excellent S/N ratio at a high degree of sensitivity can be obtained.

What we claim:

1. A light projection quantity control device for a distance measuring device, comprising:
    (a) light emitting means to alternately perform a light projecting action on an object and a no light projecting action, repeatedly;
    (b) light receiving means for receiving a reflection from said object, said light receiving means having a photo-electric conversion part arranged to produce an electric charge whose amount varies with the quantity of light incident thereon, storing means for storing an amount of electric charge produced by an incident light received during light projection and storing means for storing an amount of electric charge produced by an incident light received between light projections;
    (c) detecting means for detecting the stored amount of electric charge of said light receiving means; and
    (d) light emission duty ratio converting means for changing the light emission duty ratio of said light emitting means in response to a signal produced by said detecting means.

2. A light projection quantity control device according to claim 1, wherein said light emission duty ratio converting means comprises
    comparison means for comparing the signal from said detecting means with a reference signal and means for changing the duty ratio of said light emitting means according to the result of the comparison.

3. A light projection quantity control device according to claim 2, further comprising:
    timer means for keeping the detecting time of said detecting means unvarying.

4. A light projection quantity control device according to claim 1, 2 or 3, further comprising:
    first warning means for producing a warning when the amount of electric charge stored by said light receiving means within a predetermined period of time is insufficient.

5. A distance measuring device comprising:
    (a) light emitting means to illuminate a distance measuring object and to alternately perform a light projecting action and a no light projecting action repeatedly;
    (b) light receiving means for receiving a reflection from said distance measuring object, said light receiving means having a photo-electric conversion part to produce an electric charge the amount of which varies with the quantity of light incident thereon, first storing means for storing an amount of electric charge produced by an incident light received during light projection from said light emitting means, and second storing means for storing an amount of electric charge produced by incident light received during the time of no light projection, each of said storing means including a gate;
    (c) pulse generating means to generate signals for controlling the operation timing of the distance measuring device, said signals including a first pulse to control the light projecting time of said light emitting means, a second pulse to control the no light projecting time of said light emitting means, and a third pulse to control a clearing time for clearing the electric charge stored by said light receiving means; and
    (d) clearing means for clearing the electric charge stored by said light receiving means, said clearing means being arranged to clear said stored electric charge by opening and closing the gate of each of said storing means of said light receiving means in response to said third pulse.

6. A distance measuring device according to claim 5, wherein said clearing means is arranged to clear the stored electric charge by comparing the stored amount of said electric charge with a predetermined value.

7. A projection light quantity control device for a distance measuring device, comprising:
    (a) light emitting means to alternately and repeatedly perform a light projecting action on an object, each of said storing means including a gate and a no light projecting action;
    (b) light receiving means for receiving a reflection from the object, said light receiving means including a photo-electric conversion portion to produce an electric charge the amount of which varies with the quantity of light indident thereon and storing means for storing the amount of electric charge produced by incident light received during the time of light projection performed by said light emitting means and during the time of no light projection;
    (c) detecting means for detecting the stored amount of electric charge of said light receiving means; and
    (d) a control circuit arranged to change the oscillation frequency of said light emitting means according to a detection signal produced by said detecting means.

8. A projection light quantity control device for a distance measuring device, comprising:

(a) light emitting means to alternately and repeatedly perform a light projecting action on an object whose distance is to be measured and a no light projecting action;
(b) light receiving means for receiving a reflection from the object, said light receiving means including a photo-electric conversion portion to produce an electric charge the amount of which varies with the quantity of light incident thereon, including,
first storing means for storing the amount of electric charge produced by incident light received during the light projecting action,
second storing means for storing the amount of electric charge produced by an incident light received during the time of no light projecting action,
a differential amplifier to perform a subtracting operation on the stored amounts of electric charge at said storing means, and
a gate portion to pass said stored electric charge from each of said storing means to said differential amplifier; and
(c) a control circuit for controlling said light emitting means and said light receiving means, including,
a pulse generating circuit to produce reference pulses,
a light emission control circuit to cause said light emitting means to alternately repeat said light projecting action and the no light projecting action on the basis of the cycle of said reference pulses,
a detection circuit to detect the amount of electric charge stored by said light receiving means, and
a change-over circuit to shift the light emitting cycle of said light emitting means in response to a signal from said detection circuit.

9. A projection light quantity control device according to claim 8, wherein said light emission control circuit includes a delay circuit to produce a light emission signal a predetermined period to time after said reference pulse is produced.

10. A light projection quantity control device for a distance measuring device, comprising:
(a) light emitting means for alternately performing a light projecting action and a no light projecting action, repeatedly;
(b) light receiving means for receiving a reflection from an object for photo-electrically converting the light, said light receiving means having a plurality of light receiving regions;
(c) first storing means for storing an electric charge produced by incident light received in each light receiving region of said light receiving means during the light projection by said light emitting means;
(d) second storing means for storing an electric charge produced by incident light received in each light receiving region of said light receiving means during the time when no light projection is performed by said light emitting means;
(e) means for obtaining a sum of said stored electric charge form each light receiving region during the light projection based on the amount of electric charge stored at said first and second storing means;
(f) means for detecting whether a level of a storing signal for said sum of stored electric charge has reached a predetermined level of not; and
(g) means for receiving an output signal from said detecting means and for lowering the level of the storing signal within one cycle of light projection and no light projection by said light emitting means when said storing signal level exceeds the predetermined level.

11. A light projecting quantity control device according to claim 10, wherein said means for lowering the level of the storing signal comprises means for raising a frequency of light projection and no light projection by said light emitting means.

* * * * *